United States Patent [19]

Neko

[11] Patent Number: 4,802,834

[45] Date of Patent: Feb. 7, 1989

[54] ERROR DETECTOR FOR VARIOUS SET VALUES OF AN INJECTION-MOLDING MACHINE

[75] Inventor: Noriaki Neko, Hachioji, Japan

[73] Assignee: Fanuc Ltd, Minamitsuru, Japan

[21] Appl. No.: 104,107

[22] PCT Filed: Jan. 23, 1987

[86] PCT No.: PCT/JP87/00045

§ 371 Date: Sep. 21, 1987

§ 102(e) Date: Sep. 21, 1987

[87] PCT Pub. No.: WO87/04388

PCT Pub. Date: Jul. 30, 1987

[30] Foreign Application Priority Data

Jan. 24, 1986 [JP]  Japan ................................. 61-12141

[51] Int. Cl.⁴ ..................... B29C 45/77; B29C 45/80
[52] U.S. Cl. ................................. 425/138; 264/40.5;
425/145; 425/149; 425/150; 425/170
[58] Field of Search .............. 425/138, 135, 143, 145,
425/149, 150, 170, 171; 264/40.1, 40.5, 40.6

[56] References Cited

U.S. PATENT DOCUMENTS 4,583,931  4/1986  Fujita et al. .................... 425/170

FOREIGN PATENT DOCUMENTS 249734  6/1986  Japan .

Primary Examiner—Jay H. Woo
Assistant Examiner—Timothy W. Heitbrink
Attorney, Agent, or Firm—Staas & Halsey

[57] ABSTRACT

An error detector for various set values is provided which is incorporated in an injection-molding machine of a type controlled by a numerical control unit (1).

In order to prevent wrong operations of the injection-molding machine due to setting errors of set values, in the error detector, discrimination means (3) determines whether set values of various items of forming conditions, inputted through input means (14), fulfill requirements related to the items. If the inputted set values fulfill the requirements, they are stored in memory means (6). If not, an alarm is delivered.

5 Claims, 10 Drawing Sheets

CLAMPING POSITION

CLAMPING POSITION

ERROR DETECTOR FOR VARIOUS SET VALUES OF AN INJECTION-MOLDING MACHINE

TECHNICAL FIELD

The present invention relates to an injection-molding machine, and more particularly, to a setting error detector capable of detecting setting errors of various set values of an injection-molding machine controlled by means of a numerical control unit (hereinafter referred to as NC unit).

BACKGROUND ART

In conventional hydraulic injection-molding machines, a limit switch or the like has been used to set various set values, including changing positions for the mold closing and opening speeds of a clamping unit (mold clamper), injection-speed changing positions, changing positions for the rotating speed of a screw during metering, the ejection forward and reverse positions of an ejector, etc. Therefore, the set values have suffered only minor setting errors. Recently has been developed, however, an injection-molding machine which uses servomotors as various drive sources, and is controlled by means of an NC unit. In the injection-molding machine of this type, the various set values are set in the form of numerical values through a keyboard of a manual data input unit with a CRT display (hereinafter referred to as MDI/CRT).

The control of the injection-molding machine by means of the NC unit is performed in accordance with the various set values indicative of, for example, the changing positions for the mold closing and opening speeds of the clamping unit, the changing positions for the injection speed of an injection unit, and the ejector forward and reverse positions of the ejector. In mold opening control of a mold, for example, the mold typically is first moved to an acceleration start position P1 at a mold release speed V1, as shown in FIG. 1. Then, the mold is moved from the acceleration start position P1 to a deceleration start position P2 at a high mold opening speed V2. From the deceleration start position P2 to a mold opening end position P3, the mold is moved at a low mold opening speed V3. Usually, an NC program for such mold opening control is composed of a macro-program for higher universality. For example, the velocities V1 to V3 and the positions P1 to P3 are set by using macro-variables #500 to #505 which can be set to various values. Thus, the following NC program is prepared.

Y#503 F#500
Y#504 F#501
Y#505 F#502

Here symbols Y and F designate a clamp axis and a speed, respectively. According to the program for mold opening control, composed of the above three blocks, a command for movement is delivered in the first block such that the mold is moved to the position P1, which is set by means of the macro-variable #503, at the speed V1, which is set by means of the macro-variable #500. When the first block terminates, a command is delivered in the second block such that the mold is moved to the deceleration start position P2, which is set by means of the macro-variable #504, at the speed V2, which is set by means of the macro-variable #501. In the third block, a command is delivered such that the mold is moved to the mold opening end position P3, which is set by means of the macro-variable #505, at the speed V3, which is set by means of the macro-variable #502. The mold opening operation is controlled in this manner.

Unless there are relations:
clamp stroke $\geq$ #505 $\geq$ #504 $\geq$ #503 $\geq$ 0 between the set values based on the macro-variables #503, #504 and #505, the clamping unit suffers an abnormal mold opening operation such that the mold closes again after being opened, for example, even during a mold opening cycle in which the mold should be driven only in the opening direction.

In order to accomplish required operations in various control modes (items) of the injection-molding machine, as well as the aforementioned mold opening operation, there must be predetermined relations, as mentioned later in detail, between the set values related to the operations concerned. If these requirements are not fulfilled by the inputted set values, the control operations suffer troubles and are performed wrongly, as described above in connection with the mold opening operation.

DISCLOSURE OF THE INVENTION

The object of the present invention is to provide an injection-molding machine which is controlled by means of a numerical control unit, and in which set values of inputted molding conditions are allowed to be inputted only when they fulfill requirements of the molding conditions, so that the injection-molding machine can be prevented from operating wrongly due to setting errors of the set values.

In order to achieve the above object of the present invention, there is provided an error detector for various set values of an injection-molding machine controlled by means of a numerical control unit, comprising: input means for inputting set values of various items of molding conditions; memory means for storing the set values of the various items of the molding conditions; discrimination means for determining whether input data on the various items, inputted by means of the input means, fulfill requirements related to the items; memory control means adapted to cause the memory means to store the input data as set values of the items when the discrimination means concludes that the requirements are fulfilled; and alarm means adapted to deliver an alarm when the discrimination means concludes that the requirements are not fulfilled.

According to the present invention, as described above, whether the molding requirements are fulfilled by input data related to items to be set is determined in setting the molding conditions, and the set values can be inputted for setting only when the set values are inputted properly, so that anyone can easily set various set values of the molding conditions without errors.

BEST MODE OF CARRYING OUT THE INVENTION

Figure 2:
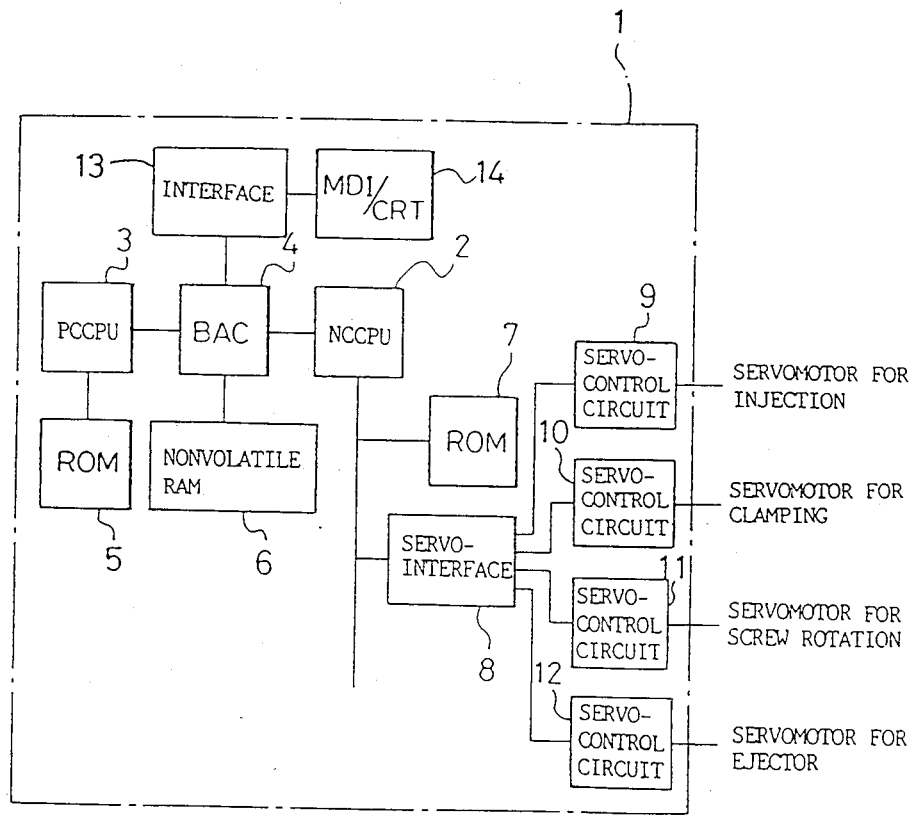
FIG. 2 is a block diagram showing an injection-molding machine according to an embodiment of the present invention.

FIG. 2 shows a principal part of an NC unit for effecting an embodiment of the present invention. In FIG. 2, the NC unit 1 includes a microprocessor (hereinafter referred to as CPU) 2 for NC, and a CPU 3 for a programmable controller (hereinafter referred to as PC). The PCCPU 3 is connected with a ROM 5 which stores a sequence program for an injection-molding machine. The NCCPU 2 is connected with a ROM 7 which stores a control program for generally controlling the injection-molding machine. The NCCPU 2 is also connected, through a servo-interface 8, with servo-control circuits 9 to 12 for controlling the drive of various servomotors for injection, clamping, screw rotation, and ejector operation. Numeral 6 denotes a nonvolatile RAM which, including a backup power source, stores programs for controlling individual operations of the injection-molding machine, various set values, parameters, etc., as mentioned later. Numeral 14 denotes an MDI/CRT, which is connected to a bus-arbiter controller (hereinafter referred to as BAC) 4 through an interface 13. The BAC 4 is connected with the respective buses of the NCCPU 2, the PCCPU 3, and the nonvolatile RAM 6. The bus to be used is controlled by the BAC.

The requirements to be fulfilled in setting the various set values for the molding conditions, by means of the MDI/CRT 14, will now be described.

Figure 1:
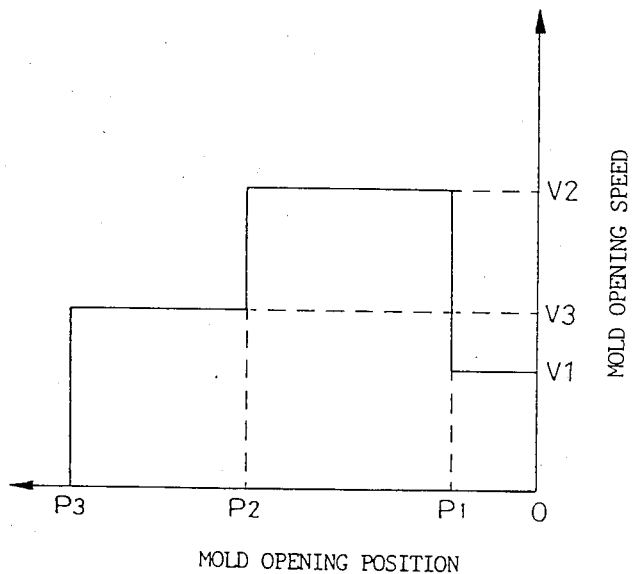
FIG. 1 is a diagram for illustrating mold opening operation.
Figure 3:
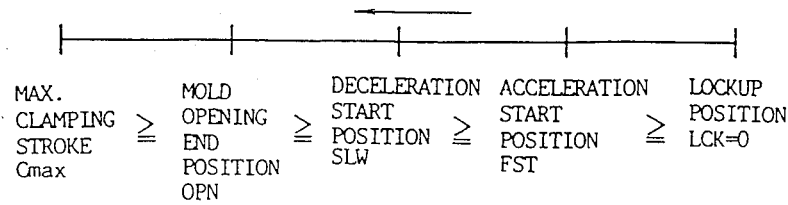
FIG. 3 is a diagram for illustrating the relations between various set values for the mold opening operation in a clamping position.

(i) Setting of mold opening operation:

The predetermined requirements to be fulfilled in the setting of the mold opening operation has already been described with reference to FIG. 1. To fulfill these requirements, the following expression (1) must be established between a lockup position LCK (=0) where a toggle link of a clamping unit (mold clamping mechanism) extends to its full length, an acceleration start position FST, a deceleration start position SLW, a mold opening end position OPN, and the maximum stroke Cmax of the clamping unit, as shown in FIG. 3.

$$Cmax \geq OPN \geq SLW \geq FST \geq LCK = 0. \quad (1)$$

If the set values of the parameters LCK to Cmax do not agree with the relationships indicated by the expression (1), wrong operations will be caused during the mold opening operation.

Figure 4:
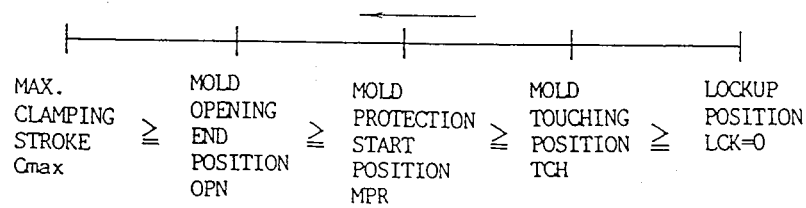
FIG. 4 is a diagram for illustrating the relations between various set values for mold closing operation in the clamping position.

(ii) Setting of mold closing operation:

In the mold closing operation, a moving platen is moved from the mold opening end position OPN to a mold protection start position MPR at high speed, and from the mold protection start position MPR to a mold touching position TCH at low speed. Further, the moving platen is moved from the mold touching position TCH to the lockup position LCK where a toggle mechanism locks up, that is, the position where the clamping position is "0" (normally, the lockup position LCK serves as the starting point). Thus, those set values must fulfill the following expression (2), as shown in FIG. 4.

$$Cmax \geq OPN \geq MPR \geq TCH \geq LCK = 0. \quad (2)$$

Figure 5:
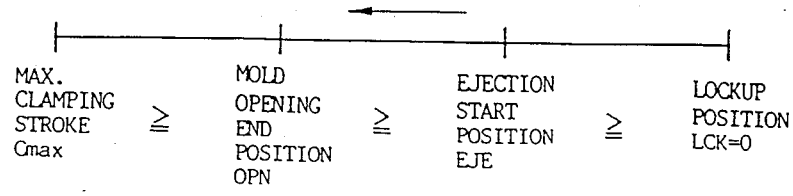
FIG. 5 is a diagram for illustrating the relations of an ejection start position to other positions, with respect to the clamping position.
Figure 6:
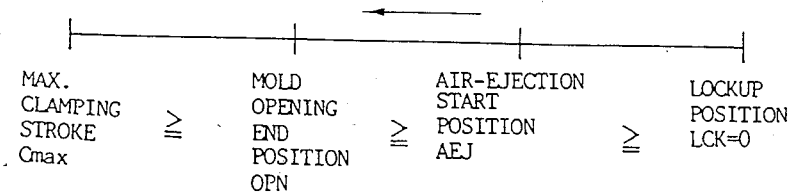
FIG. 6 is a diagram for illustrating the relations of an air-ejection start position, with respect to the clamping position.

(iii) Setting of ejection start position and air-ejection start position:

Ejection and air ejection must be started before the clamping mechanism finishes mold opening. Accordingly, start positions EJE and AEJ for these operations must be set so that the following expressions (3) and (4) hold true, as shown in FIGS. 5 and 6.

$$Cmax \geq OPN \geq EJE \geq LCK = 0, \quad (3)$$

$$Cmax \geq OPN \geq AEJ \geq LCK = 0. \quad (4)$$

Figure 7:
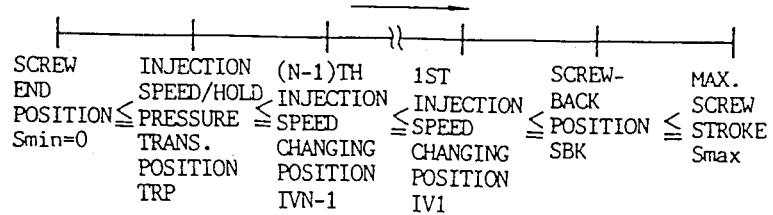
FIG. 7 is a diagram for illustrating injection-speed changing positions.

(iv) Setting of positions for changing injection speed and transferring from injection speed control to hold pressure control:

Normally, the injection speed is changed successively in several stages. At the end of the final stage of injection speed control, the injection speed control is switched over to hold pressure control. In order to control such transferring as intended, the following inequality (5) must hold for positions for the switching, as shown in FIG. 7. If this inequality does not hold true, a screw undergoes a wrong operation, that is, it retreats. Here the origin of the coordinate for setting the switching positions is at a position Smin where the screw end is in alignment with the end of a heating cylinder. Symbol Smax designates the maximum stroke of an injection axis; SBK, a set screw-back position; IV1 to IVN-1, injection-speed changing positions between adjacent stages or first to Nth stages; and TRP, a position for transferring from injection speed control to hold pressure control.

$$0 = Smin \leq TRP \leq IVN\text{-}1 \ldots \leq IV1 \leq SBK \leq Smax. \quad (5)$$

Figure 8:
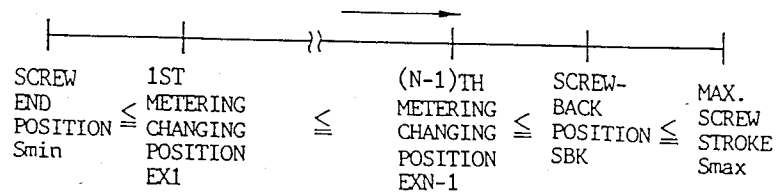
FIG. 8 is a diagram for illustrating metering changing positions.

(v) Setting of changing positions for screw rotating speed:

Also in metering, the rotating speed of the screw is changed in several stages according to the screw position. Also in this case, the changing positions for the individual stages must be set so that the following inequality (6) holds true, as shown in FIG. 8. Symbols EX1 to EXN-1 designate the changing positions for the individual metering stages.

$$0 = Smin \leq EX1 \ldots \leq EXN\text{-}1 \leq SBK \leq Smax. \quad (6)$$

Figure 9:
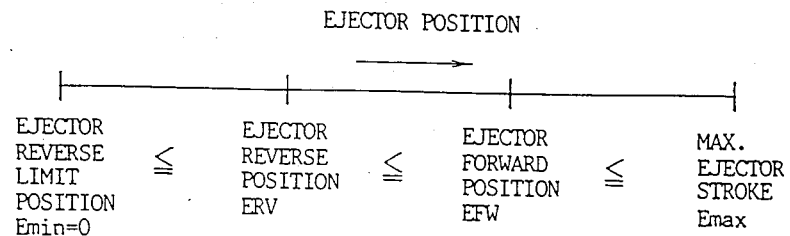
FIG. 9 is a diagram for illustrating ejection forward and reverse positions.

(v) Setting of ejection forward and reverse positions:

As shown in FIG. 9, the following expression (7) must hold for the relationships between an ejection forward position EFW, ejection reverse position ERV, maximum stroke Emax of an ejector, and ejection reverse limit position Emin=0.

$$Emin = 0 \leq ERV \leq EFW \leq Emax. \quad (7)$$

Thereupon, a picture for setting required conditions is selectively displayed on a CRT screen (not shown) of the MDI/CRT 14, and various data are set by means of a keyboard (not shown) of the MDI/CRT 14. In doing this, PCCPU 3 reads out these set values x, and determines whether they satisfy the requirements of the expressions (1) to (7). Referring now to the flow charts, the operation processing will be described.

Figure 10:
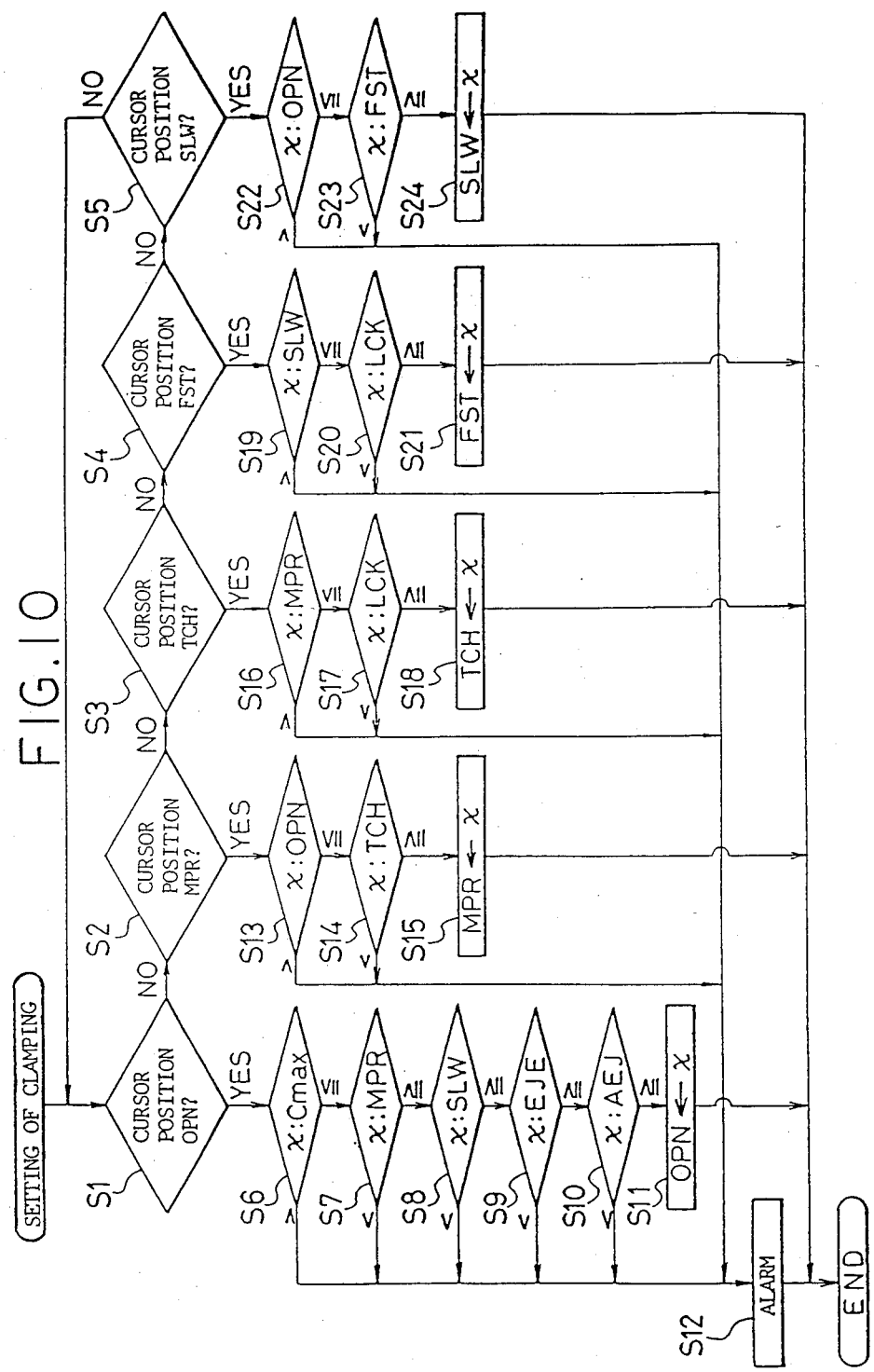
FIG. 10 is an input-processing flow chart for various set values related to clamping operation.

(a) Setting of clamping conditions:

First, a picture for setting the clamping conditions is selected on the CRT screen of the MDI/CRT 14, a cursor is moved to each of cursor positions for the input of the following various positions, and corresponding data are inputted successively by means of the keyboard. Thereupon, the PCCPU 3 determines whether the set cursor position is the mold opening end position OPN, mold protection start position MPR, mold touching position TCH, acceleration start position FST, or deceleration start position SLW (Step S1 to S5), as shown in FIG. 10. If the cursor is situated at the mold opening end position OPN, whether the input data x is larger than the value of the maximum clamping stroke Cmax of the clamping unit is determined (Step S6). If the data x is larger than the value Cmax, an alarm is delivered (Step S12) and displayed on the CRT screen, for example. If the data x is smaller than or equivalent to (hereinafter referred to simply as "smaller than") the value Cmax, whether the input data x is larger than the value of the mold protection start position MPR is then determined (Step S7). If the data x is smaller than the value MPR, an alarm is delivered (Step S12). If the data x is larger than or equivalent to (hereinafter referred to simply as "larger than"), whether the input data x is larger than the value of the deceleration start position SLW is determined (Step S8). If the data x is smaller than the value SLW, an alarm is delivered (Step S12). If the former is larger than the latter, whether the input data x is larger than the value of the ejection start position EJE is then determined (Step S9). If the data x is smaller than the value EJE, an alarm is delivered (Step S12). If the former is larger than the latter, whether the input data x is larger than the value of the air-jection start position AEJ is determined (Step S10). If the data x is smaller than the value AEJ, an alarm is then delivered (Step S12). If the former is larger than the latter, the input data x is displayed corresponding to the mold opening end position OPN on the CRT screen, and is stored in the nonvolatile RAM 6 (Step S11).

Thus, the requirements associated with the mold opening end position OPN are the following conditions (8) to (11), which have already been given by the expressions (1) to (4).

$$Cmax \geq OPN \geq SLW, \qquad (8)$$

$$Cmax \geq OPN \geq MPR, \qquad (9)$$

$$Cmax \geq OPN \geq EJE, \qquad (10)$$

$$Cmax \geq OPN \geq AEJ. \qquad (11)$$

Whether the requirements of the expression (8) are fulfilled is determined in Steps S6 and S8. For the expressions (9), (10) and (11), the fulfillment of the requirements is determined in Steps S6 and S7, Steps S6 and S9, and Steps S6 and S10, respectively. If the requirements of the expressions (8) to (11) are all fulfilled, it is concluded that the input data x is set properly, and the data x is stored fixedly.

If the cursor is situated at the mold protection start position MPR (Step S2), which is related only to the expression (2), the requirements are fulfilled when the input data x is smaller than the value of the mold opening end position OPN and larger than the value of the mold touching position TCH. Thereupon, the fulfillment of these requirements is determined in Steps S13 and S14. If the requirements are fulfilled, the input data is displayed on a display position of the CRT for the mold protection start position, and is stored in the nonvolatile RAM 6 (Step S15). If the requirements are not fulfilled, on the other hand, an alarm is delivered (Step S12).

If the cursor is situated at the mold touching position TCH (Step S3), which is related only to the expression (2), the input data x is displayed and stored in the nonvolatile RAM 6, in the same manner as aforesaid, when it is smaller than the value of the mold protection start position MPR and larger than the value of the lockup position LOK=0 (Steps S16 to S18). If the above requirements are not fulfilled, an alarm is delivered (Step S12).

If the cursor is situated at the acceleration start position FST, the input data x is displayed and stored fixedly in the nonvolatile RAM 6 (Step S21) when it is smaller than the value of the deceleration start position SLW and larger than the value of the lockup position LCK=0 (Steps S4, S19 and S20). If the cursor is situated at the deceleration start position SLW, on the other hand, the input data x is displayed and stored fixedly in the nonvolatile RAM 6 (Step S24) when it is smaller than the value of the mold opening end position OPN and larger than the value of the acceleration start position FST (Steps S5, S22 and S23). If the requirements are not fulfilled, an alarm is delivered for each case (Step S12).

In this manner, the set conditions for clamping, related to the mold opening and closing operations, and the fulfillment of the requirements for the ejection start position and the air-ejection start position, related to the clamping operation, are checked. If the setting is proper, the individual input data are displayed on the CRT screen and stored as set values.

(b) Setting of ejecting conditions:

The set values EJE, AEJ, EFW, and ERV, which are related to ejection, must fulfill the following relations with respect to the expressions (3), (4) and (7).

$$OPN \geq EJE \geq LCK=0, \qquad (12)$$

$$OPN \geq AEJ \geq LCK=0, \qquad (13)$$

$$Emax \geq EFW \geq FRV \geq Emax=0. \qquad (7)$$

Figure 11:
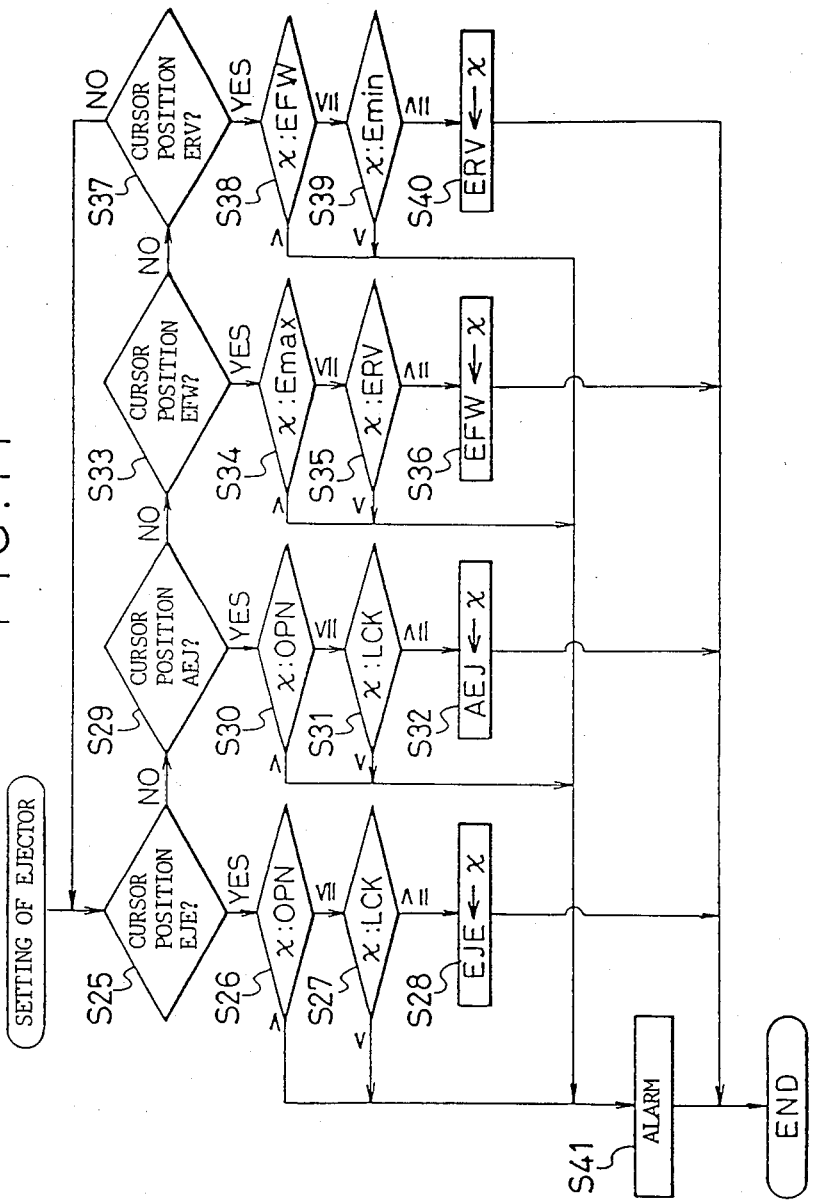
FIG. 11 is an input-processing flow chart for various set values related to ejecting operation.

Thereupon, if the cursor is situated at the ejection start position EJE (Step S25), as shown in FIG. 11, whether the expression (12) is fulfilled by the input data x is determined in Steps S26 and S27. If the expression (12) is fulfilled, the input data x is displayed and stored in the nonvolatile RAM 6 in Step S28. If the cursor is situated at the air-ejection start position AEJ (Step S29), whether the expression (13) is fulfilled is determined in Steps S30 and S31. If the expression (13) is fulfilled, the input data x is displayed and stored in the nonvolatile RAM 6 (Step S32). If the cursor is situated at the ejection forward position EFW (Step S33), whether the relation $E_{max} \geq EFW \geq ERV$ in the expression (7) is fulfilled by the input data x is determined in Steps S34 and S35. If this relation is fulfilled, the input data x is displayed and stored in the nonvolatile RAM 6 (Step S36). If the cursor is situated at the ejection reverse position ERV (Step S37), whether the relation $EFW \geq ERV \geq E_{min} = 0$ in the expression (7) is fulfilled is determined in Steps S38 and S39. If this relation is fulfilled, the input data x is displayed and stored in the nonvolatile RAM 6 (Step S40). If the requirements corresponding to each of the aforementioned processes are not fulfilled, an alarm is delivered (Step S41), and the input data is not stored for setting.

(c) Setting of injection-speed changing positions:

As regards the setting of the injection-speed changing positions, the relation of the expression (5) must be fulfilled, as shown in FIG. 5.

Figure 12:
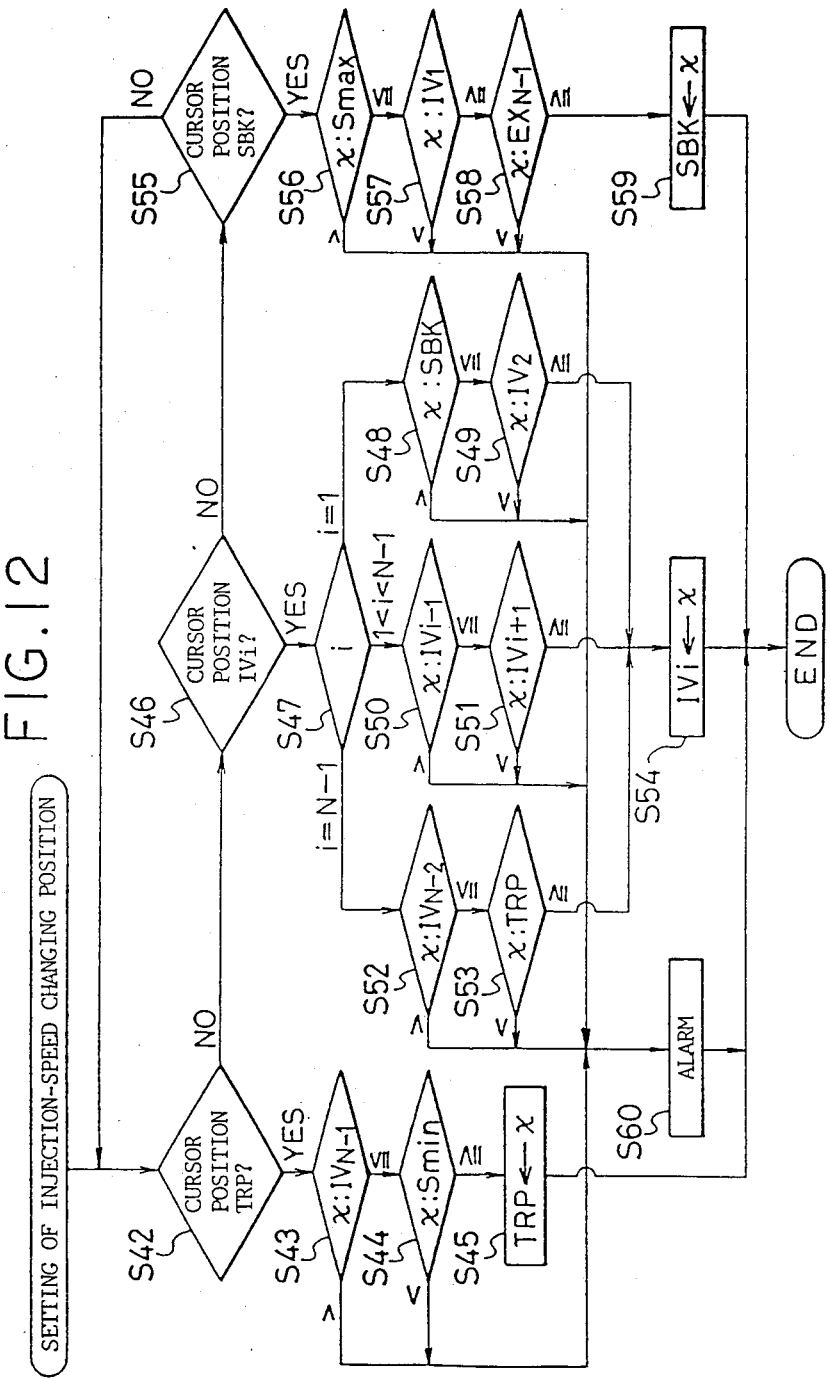
FIG. 12 is an input-processing flow chart for setting the injection-speed changing positions.

Thereupon, if the cursor is situated at the position TRP for transferring injection speed control to hold pressure control (Step S42), as shown in FIG. 12, whether the input data x is smaller than the value of the (N−1)th injection-speed changing position IVN-1, between the (N−1)th speed control stage and the final stage, and larger than the value of the end position $S_{min} = 0$ of the screw is determined. If these requirements are fulfilled, the input data x is displayed and stored in the nonvolatile RAM 6, in the same manner as aforesaid (Steps S43 to 45). If the cursor is situated at an ith injection-speed changing position IVi (i=1 to N−1) (Step S46), the precedence of the changing position at which the cursor is situated is ascertained (Step S47). If the changing position concerned is the first position (IV1), whether the input data x is smaller than the value of the screw-back position SBK and larger than the value of the second changing position IV2 is determined in Steps S48 and S49. If these requirements are fulfilled, the input data x is displayed and stored in the nonvolatile RAM 6 (Step S54). If the cursor is situated at any of the second to (N−2)th changing positions IV2 to IVN-2, whether the input data x is smaller than the value of the immediately preceding changing position IVi-1 and larger than the value of the next changing position IVi+1 is determined (Steps S50 and S51). If these requirements are fulfilled, the input data x is displayed and stored in the nonvolatile RAM 6 (Step S54). If the cursor is situated at the (N−1)th changing position IVN-1 for switching to the final injection speed control stage, whether the input data x is smaller than the value of the preceding changing position IVN-2 and larger than the value of the transferring position TRP for hold pressure control is determined (Steps S52 and S53). If these requirements are fulfilled, the input data x is displayed and stored in the nonvolatile RAM 6 for setting, in the same manner as aforesaid (Step S54). If the cursor is situated in the screw-back position SBK (Step S55), whether the input data x is smaller than the value of the maximum screw stroke Smax of an injection mechanism, larger than the value of the first speed changing position IV1, and larger than the value of the changing position EXN-1 for the final metering stage related to the expression (6) is determined (Steps S56 to S58). If these requirements are fulfilled, the input data x is displayed and stored in the nonvolatile RAM 6 for setting.

If the requirements in the aforementioned processes are not fulfilled, an alarm is delivered (Step S60), and the input data x is not stored for setting.

(d) Setting of metering changing positions:

For the setting of the metering changing positions, the relation of of FIG. 8 and the expression (6) must be fulfilled.

Figure 13:
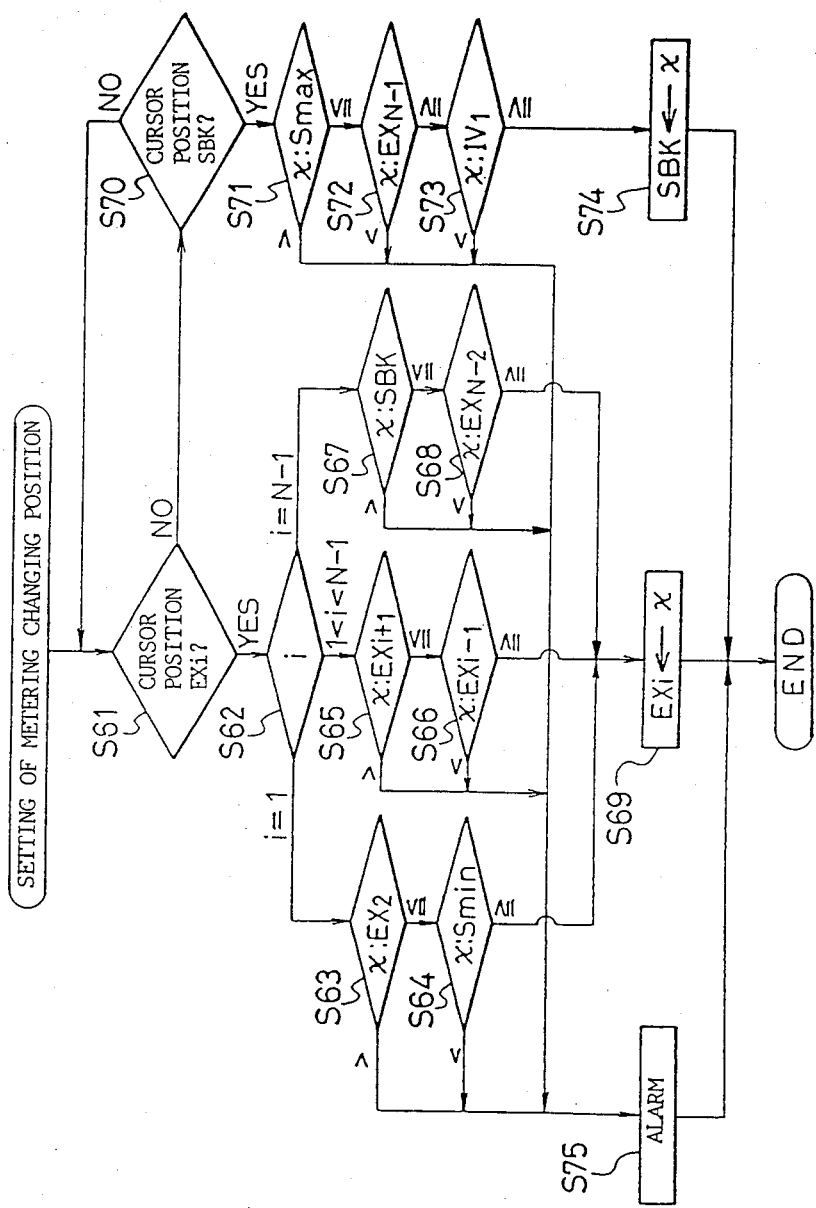
FIG. 13 is an input-processing flow chart for the metering changing positions.

In the process of this case, if the cursor is situated at a metering changing position EXi (i=1 to N−1) (Step S61), as shown in FIG. 13, the precedence of the changing position at which the cursor is situated is ascertained (Step S62). If the changing position concerned is the first changing position EX1, whether the input data x is smaller than the value of the next changing position EX2 and larger than the value of the screw end position $S_{min} = 0$ is determined (Steps S63 and S64). If these requirements are fulfilled, the input data x is displayed and stored in the nonvolatile RAM 6 for setting. If the cursor is situated at any of the second to (N−2)th changing positions EX2 to EXN-2, whether the input data x is smaller than the value of the next changing position EXi+1 and larger than the value of the immediately preceding changing position EXi-1 is determined (Steps S65 and S66). If these requirements are fulfilled, the input data x is displayed and stored in the nonvolatile RAM 6. If the cursor is situated at the (N−1)th changing position EXN-1 for switching to the final metering stage, whether the input data x is smaller than the value of the screw-back position SBK and larger than the value of the immediately preceding changing position EXN-2 is determined (Step S68). If these requirements are fulfilled, the input data x is displayed and stored in the nonvolatile RAM 6, in the same manner as aforesaid.

If the cursor is situated at the screw-back position SBK (Step S70), whether the input data x is smaller than the value of the maximum stroke Smax of the screw, larger than the value of the changing position EXN-1 for switching to the final metering stage, and larger than the value of the first changing position IV1 for switching from the first injection speed control stage to the second injection speed control stage is determined (Steps S71 to S73). If these requirements are fulfilled, the input data x is displayed and stored in the nonvolatile RAM 6 for setting.

If the requirements in the aforementioned processes are not fulfilled by the input data x, an alarm is delivered, and the input data x is neither displayed nor stored in the nonvolatile RAM 6 for setting (Step S75).

Thus inputted for setting, the set values for the molding conditions cannot be inputted by mistake. Thus, the injection-molding machine is prevented from suffering a wrong operation due to input errors.

I claim:

1. An error detector for various set values of an injection-molding machine controlled by means of a numerical control unit, comprising:

input means receiving input data respectively associated with set values of various items of molding conditions, said molding conditions including at least one of damping conditions, selection conditions, injection conditions and metering conditions;

memory means for storing the set values of the various items of said molding conditions;

discrimination means for determining whether input data of said various items, manually input through said input means, fulfill requirements related to said items, said discrimination means being operable to compare sizes of input data related to individual requirements and determining whether said input data fulfill their corresponding requirements when the input data have predetermined size relations;

memory control means for controlling said memory means to store said input data as set values of said items when said discrimination means concludes that said requirements are fulfilled, said injection molding machine being operated in accordance with the stored set values; and alarm means, adapted to deliver an alarm when said discrimination means concludes that said requirements are not fulfilled, for preventing errors by setting errors of said set values and a resultant wrong operation of said injection-molding machine.

2. An error detector according to claim 1, wherein said items of said molding machine include a clamping condition, and the requirements related to said clamping condition are fulfilled when input data associated with a lock-up position, an acceleration start position, a deceleration start position, a mold opening end position, and a maximum stroke of a clamping unit of said injection molding machine, respectively, assume larger or smaller values with respect to said predetermined size relation, and simultaneously, when input data respectively associated with the lock-up position, a mold touching position and a mold protection start position, the mold opening end position and the maximum stroke assume larger values or smaller values, accordingly.

3. An error detector according to claim 1, wherein said items of said molding conditions include ejection conditions, and requirements related to said ejection conditions are fulfilled when input date respectively associated with a lock-up position, an ejection start position, a mold opening end position and a maximum stroke of a clamping unit of the injection molding unit assume larger values or smaller values with respect to predetermined size relations, in the above-mentioned order, and simultaneously when input data respectively associated with the lock-up position, an air ejection start position, the mold opening end position and the maximum stroke assume larger values or smaller values with respect to predetermined size relations in the above-mentioned order, and simultaneously when input data respectively associated with an ejection reverse limit position, an ejection reverse position, and an ejection forward position and a maximum stroke of an ejector assume larger or smaller values with respect to predetermined size relations in the above-mentioned order.

4. An error detector according to claim 1, wherein said items of said molding conditions include said injection conditions, and requirements related to said injection conditions are fulfilled when input data respectively associated with an origin of the coordinates, a position for transferring the injection speed control to hold pressure control, at least one injection speed changing position between at least one former stage and at least one latter stage, a screw-back position and a maximum stroke of an injection axis of the injection molding machine assume larger values or smaller values with respect to said predetermined size relations in the above-mentioned order.

5. An error detector according to claim 1, wherein said items of said molding conditions include said metering conditions, and requirements relating to said metering conditions are fulfilled when input data respectively associated with an origin of the coordinates, at least one changing position for screw rotating speed between at least one former stage and at least one latter stage, a screw-back position and a maximum stroke of an injection axis of the injection molding machine assume larger or smaller values with respect to said predetermined size relations in the above-mentioned order.

* * * * *

UNITED STATES PATENT AND TRADEMARK OFFICE
CERTIFICATE OF CORRECTION

PATENT NO. : 4,802,834
DATED : FEBRUARY 7, 1989
INVENTOR(S) : NORIAKI NEKO

It is certified that error appears in the above-identified patent and that said Letters Patent is hereby corrected as shown below:

Col. 5, line 43, "air-jection" should be --air-ejection--.

Col. 8, line 54, after "means" insert --for--.

Col. 9, line 30, "date" should be --data--;
      line 33, "unit" (2nd occurr.) should be --machine--;
      line 35, before "predetermined" insert --said--.

Signed and Sealed this

Twenty-seventh Day of June, 1989

Attest:

DONALD J. QUIGG

Attesting Officer     Commissioner of Patents and Trademarks